United States Patent [19]

Lawson

[11] 4,258,618
[45] * Mar. 31, 1981

[54] METHOD AND APPARATUS FOR TRIMMING ONIONS OR LIKE PRODUCE

[75] Inventor: William J. Lawson, Milton, Del.

[73] Assignee: Magnuson Engineers, Inc., San Jose, Calif.

[ * ] Notice: The portion of the term of this patent subsequent to May 13, 1997, has been disclaimed.

[21] Appl. No.: 60,215

[22] Filed: Jul. 24, 1979

Related U.S. Application Data

[63] Continuation-in-part of Ser. No. 886,470, Mar. 14, 1978, Pat. No. 4,202,261.

[51] Int. Cl.³ .............................................. A23N 15/08
[52] U.S. Cl. ........................................ 99/636; 99/643; 198/382
[58] Field of Search ................. 99/546, 635, 636, 643; 83/411 R; 426/481, 482; 198/382–384

[56] References Cited

U.S. PATENT DOCUMENTS

| | | | |
|---|---|---|---|
| 2,796,967 | 6/1957 | Myer | 198/384 |
| 3,212,545 | 10/1965 | Aguilar | 99/549 |
| 3,300,021 | 1/1967 | Holmes | 198/384 |
| 3,403,769 | 10/1968 | Anderson et al. | 198/384 |
| 3,847,070 | 11/1974 | Draggett | 99/643 |

*Primary Examiner*—Harvey C. Hornsby
*Assistant Examiner*—Timothy F. Simone
*Attorney, Agent, or Firm*—Gerald L. Moore

[57] ABSTRACT

Onions are lifted and transported individually and are transferred in succession onto an orientation conveyor where the onions are made to roll along a belt conveyor driven in the opposite direction to align the stem axes transverse to the line of movement of the conveyor. Following orientation, the onions are gripped individually and carried into engagement with a pair of laterally spaced trimming blades which cleanly snip off the protrusions at the ends of each onion along the stem axis to prepare the onions for further processing. During their movement toward the trimming blades by the gripping and carrying means, the onions engage blade connected camming means which automatically adjusts the lateral spacing of the trimming blades responsive to variations in onion size. Following the trimming operation, the onions are released automatically into a collector means.

1 Claim, 11 Drawing Figures

FIG. 1

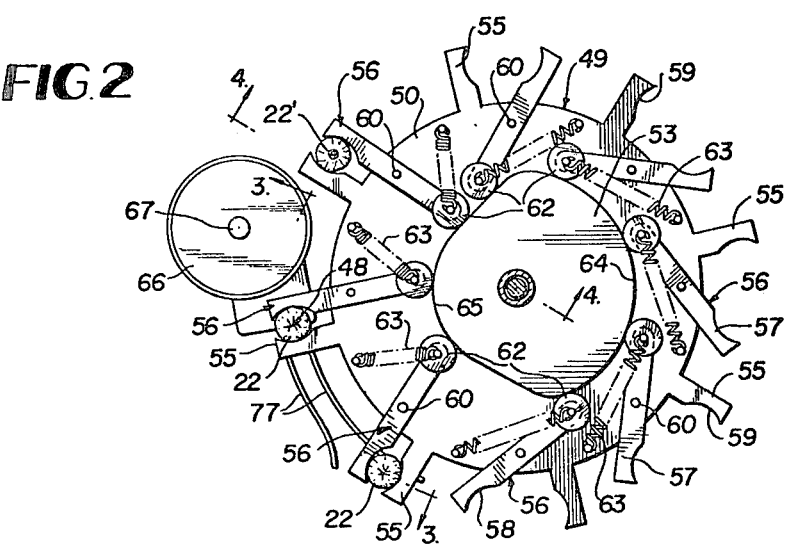
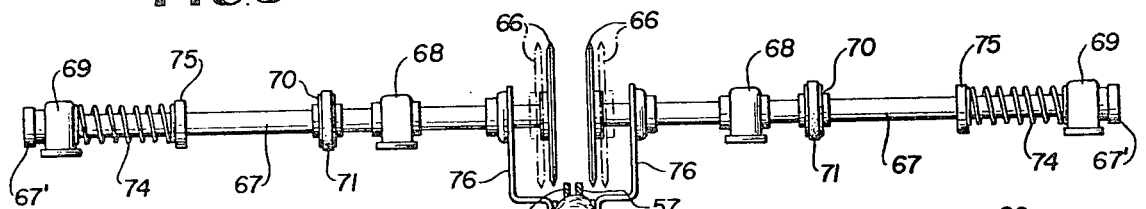
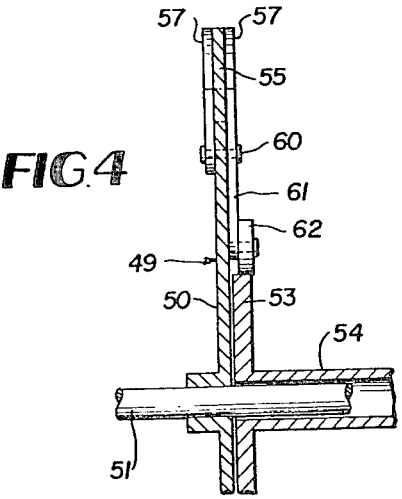
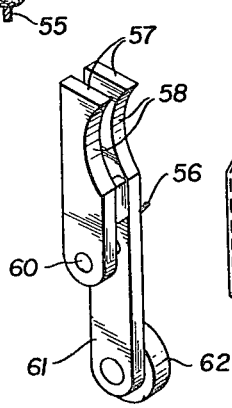

METHOD AND APPARATUS FOR TRIMMING ONIONS OR LIKE PRODUCE

RELATED APPLICATIONS

This application is a Continuation-In-Part of copending U.S. Application Ser. No. 886,470 filed on Mar. 14, 1978 and entitled: METHOD AND APPARATUS FOR TRIMMING ONIONS OR LIKE PRODUCE, U.S. Pat. No. 4,202,261.

BACKGROUND OF THE INVENTION

Devices are known in the prior art for trimming and/or peeling onions or other produce. The general objective of the present invention is to greatly improve on the known prior art through the provisions of a more simplified, reliable and more economical method and machine for automatically and continuously trimming onions while eliminating many recognized complications and deficiencies of the prior art which have hindered commercial acceptance of such machines in the past.

It is presently the practice at commercial canneries and the like for workers to pick up onions, one at a time, and hand-orient them and insert them individually into a carrier which transports the onions into engagement with trimming blades which snip off the two ends of the onions transversely of their stem axes. This process is very slow and requires an enormous amount of hand labor in relation to the amount of the product being treated. Production is limited to thirty or forty onions per minute under the traditional method. The present invention accomplishes the trimming of at least 150 onions per minute with complete automation, thus eliminating the aforementioned hand labor. The advantages of the invention over the prior art will be quickly apparent to those skilled in the art.

To comply with the duty to disclose known prior art under 37 C.F.R. 1.56, the following prior U.S. Patents are made of record herein: Nos.
2,212,213
2,289,015
2,961,023
3,154,124
3,212,545
3,402,748
3,454,066
3,621,900.

SUMMARY OF THE INVENTION

A singulator chain carrying spaced spoon elements passes upwardly through a hopper containing onions and delivers individual onions in succession to a U-configured transfer chute which in turn delivers onions one at a time in succession onto an inclined orientation surface. This surface comprises a conveyor belt along which the onions are rolled by V-configuration flights on endless chains driven in the opposite direction from that of the onion supporting conveyor belt so that the onions are rolled rapidly to cause the stem axes of the onions to become arranged transversely of their rolling paths of movement. The conveyor belt preferably is formed in U-configuration cross-section to assist in maintaining the onion on the belt and in front of the flight.

Near the top of the orientation surface, individual onions are gripped and picked up by continuously moving cam actuated grippers and are carried into engagement with spaced power driven trimming blades which snip off the protrusions at opposite ends of the onions along their stem axes. During movement from the orientation surface to the trimming blades, the onions engage camming elements connected with the blades which cause the blades to adjust laterally automatically in relation to the varying sizes of onions. Immediately following trimming, the onions are released and guided into a collection means.

BRIEF DESCRIPTION OF THE DRAWINGS

FIG. 1 is a partly schematic and partly cross section side elevational view of an onion rimming machine embodying the invention;

FIG. 2 is an enlarged side elevation, partly in section showing an onion pick-up and transfer wheel with associated spring-urged grippers and onion rimming blades and cam adjusting means;

FIG. 3 is a cross-sectional view taken substantially on line 3—3 of FIG. 2;

FIG. 4 is an enlarged cross section taken on line 4—4 of FIG. 2;

FIG. 5 is a perspective view of a pivoted gripping jaw or finger carried on the gripping wheel;

FIG. 6 is a fragmentary side elevation of a collection chute and guidance means near the top of the gripping wheel;

DETAILED DESCRIPTION OF THE DRAWINGS

Figure 1:
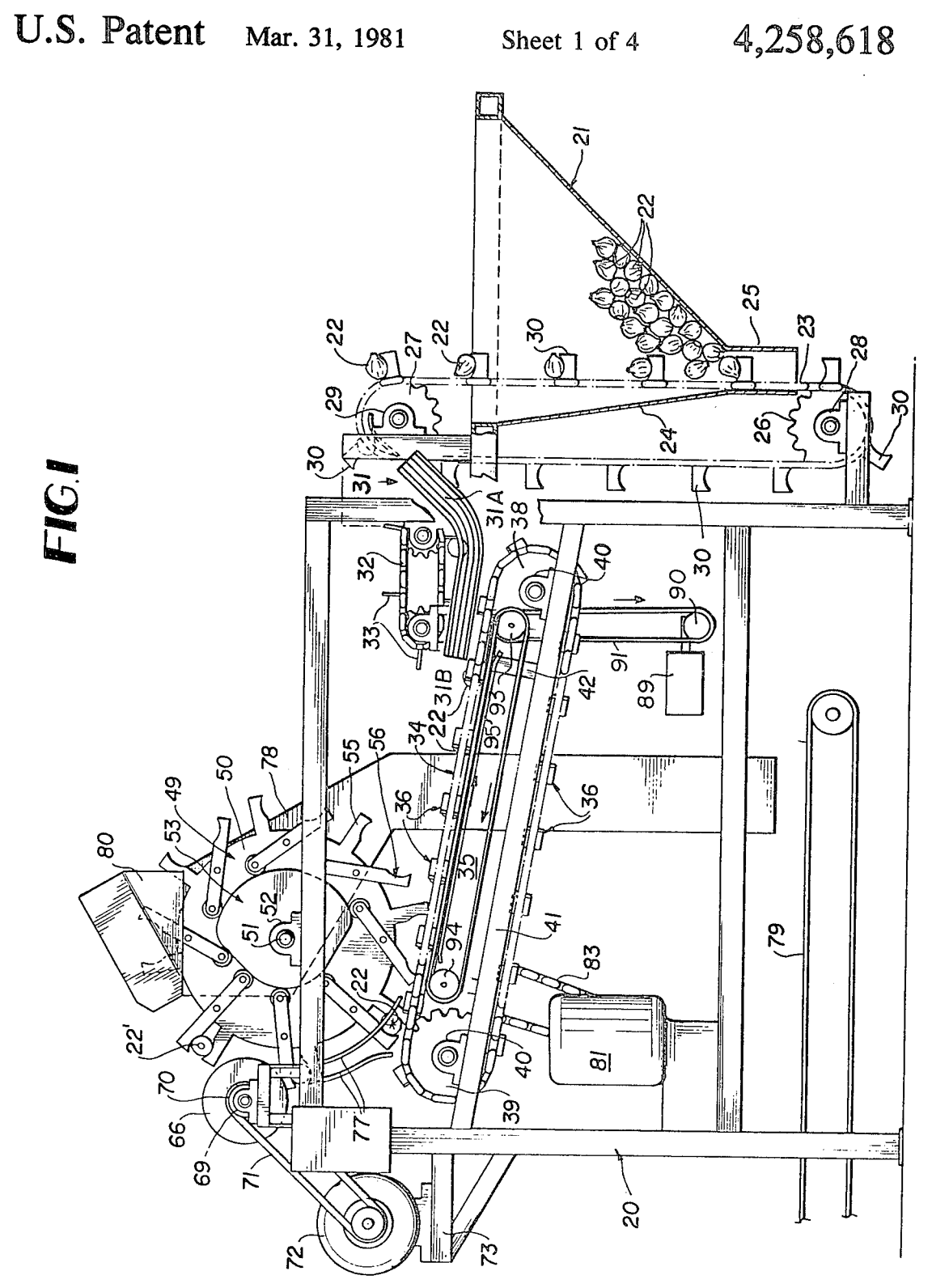
Figure 7:
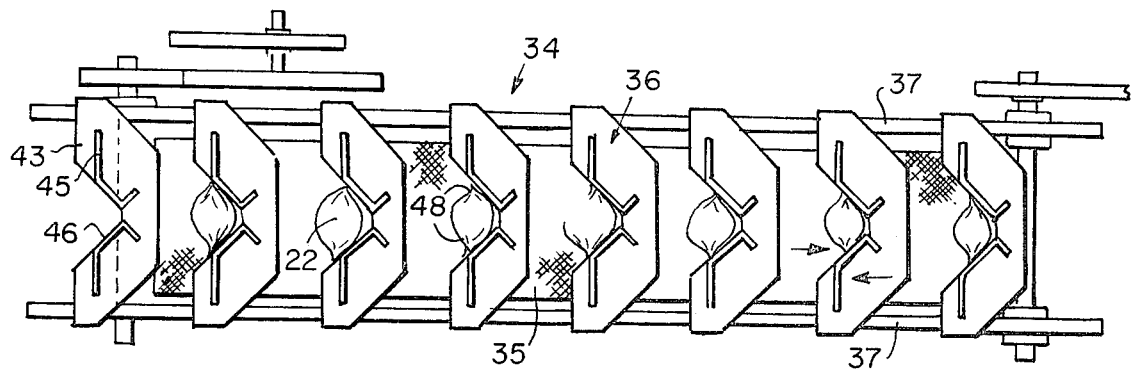
FIG. 7 is an enlarged fragmentary plan view of an orientation means forming a part of the method and machine.

Referring to the drawings in detail, wherein like numerals designate like parts, the numeral 20 designates a sturdy machine frame upon which the coacting machine components are mounted, as illustrated in FIG. 1. At one end of the frame 20, an open top hopper 21 for a multiplicity of untrimmed onions 22 is suitably supported on the frame somewhat below the top of the frame. An endless vertical singulator chain 23 has one run thereof passing through the onion hopper 21 near the generally vertical side wall 24 of the hopper which is closest to the frame 20. The chain 23 enters the bottom of the hopper through a restricted sleeve extension 25. The singulator chain engages a pair of sprocket gears 26 and 27 near the top and bottom of the frame 20 having their shafts held in bearings 28 and 29 suitably attached to the supporting frame. The chain 23 carries a plurality of equidistantly spaced spoon elements 30 which have the ability to pass upwardly through the mass of onions 22 in the hopper and lift and transport a single onion on each spoon element through the top of the hopper and around the upper gear 27 where the onions in succession are dumped by the spoon elements 30 into a short transfer trough 31 having a short horizontal endless chain 32 associated therewith including spaced flights 33 which propel the onions 22 in succession along the bottom of the trough 31 to the end of the trough from which the onions pass onto an orientation device 34 forming a very important aspect of the invention.

The device or means 34 comprises an inclined conveyor belt 35 on which the onions 22 are forced to roll upwardly under the influence of a plurality of equidistantly spaced flights or pushers 36 of wide V-configuration, connected with and carried by a pair of parallel endless chains 37 engaged with sprocket gears 38 and 39 at the bottom and top ends of the orientation device 34. The sprocket gears and chains are supported by bearings 40 suitably attached to an inclined member 41 which is integrated with the frame 20. The inclined conveyor belt 35, which is immediately below the chains 37 and the bottoms of the flights 36, is supported above the member 41 by leg members 42 or the like.

Figure 8:
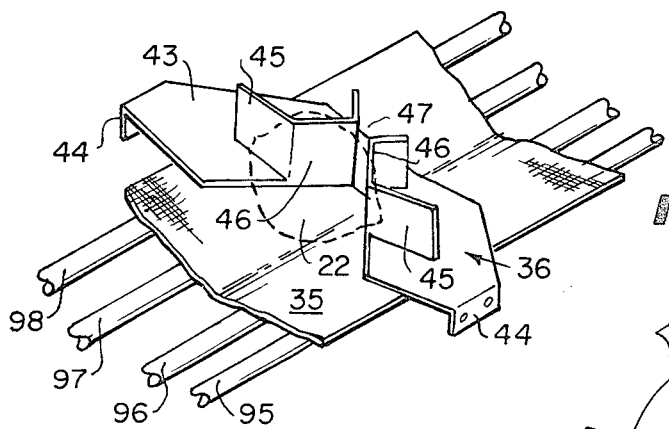
FIG. 8 is an enlarged perspective view of an orientation moving flight.

Referring to FIG. 8, each broad V-flight 36 has a base plate 43 with opposite end apertured depending flanges 44 for attachment to the two chains 37. The base plate 43 essentially slides over the conveyor belt 35 on which the onions roll in the orientation procedure. Rising from the base plate 43 at right angles are a pair of rearwardly converging wide included angle flight sections 45 having interior bent terminals 46 separated laterally to form a passageway 47 therebetween to receive an onion gripping element, yet to be described. The converging symmetrical relationship of the spaced flight sections 45 serve to pocket the onions 22 as they roll upwardly on the conveyor belt 35, FIG. 7. Because of natural laws, the onions will roll along the line of least resistance and since they are substantially circular in cross section across their stem axes, the onions will gradually be oriented near the top of the conveyor belt 35 to a condition where their stem axes on which the protrusions 48 lie are substantially perpendicular to the longitudinal axis of the device 34. That is to say, the onions are randomly placed on the lower end of the conveyor belt 35 and by the time they roll to a point near the top of this plate, they are all completely and properly oriented as clearly depicted in FIG. 7.

Following complete orientation, as described, each onion in succession is engaged near the top of the orientation device 34 by a pick-up and transport wheel 49 forming another important feature of the invention, which wheel delivers the onions in succession to trimming means, not yet described.

The pick-up wheel 49 comprises a vertically disposed wheel body or disc 50 of considerable diameter supported rotationally above the orientation device 34 on top of the frame 20 by a shaft 51 held in bearings 52 seated on the frame 20. Closely adjacent to one side of the disc 20 in a vertical plane is a relatively stationary profiled cam 53 which controls the opening and closing of pairs of coacting onion grippers on the wheel 49, now to be described. The cam 53 is supported by a tube 54 which surrounds the rotational shaft 51 of the disc 50, FIG. 4. The onion grippers of the pick-up and transport wheel 49 are formed by a first series of circumferentially equidistantly spaced rigid gripping arms or jaws 55 of equal radial lengths and preferably formed integral with the disc 50, or otherwise fixed thereto. Coacting pivoted gripping arms or jaws 56, FIG. 5, each include laterally spaced parallel jaw sections 57 whose recesses 58 are in opposed relationship to like recesses 59 of the rigid jaws 55. The jaws 56 are each pivoted between their ends at 60 to the disc 50, FIG. 4 so that the paired jaw sections 57 lie closely on opposite sides of the fixed jaws 55. Inner arm extensions 61 of the pivoted jaws 56 adjacent to one side of the disc 50 carry follower rollers 62 which ride on the profiled edge of the cam 53, as shown in the drawings.

Each pivoted jaw 56 is biased toward tripping engagement with one rigid jaw 55 by a retractile spring 63, having one end anchored to the disc 50 near its periphery and a second end anchored to the inner end of the jaw 56 near the follower roller 62, see FIG. 2. As may be clearly seen in this figure, during clockwise rotation of the wheel 49 relative to the fixed cam 53, such cam will act on the pivoted jaws 56 and against the forces of springs 63 to separate the pivoted jaws 56 from the rigid jaws 55 near the top of the wheel 49 and to allow closing of the pivoted jaws 56 under influence of the springs 63 slightly beyond the bottom of the wheel 49, FIG. 2. The cam 53 through its circular profiled portion 64 maintains the rigid and pivoted jaws separated during rotation from the top to the bottom of the wheel 49. A smaller radius circular profiled portion 65 of the cam 53 diametrically opposite the portion 64 allows the pivoted and rigid jaws to remain closed in gripping arrangement with the onions 22 while they are being transported toward and during engagement with a pair of power-operated laterally spaced parallel vertical circular trimming blades 66.

The trimming blades 66 are mounted atop the frame 20 in closely spaced relationship to the periphery of disc 50 in the following manner. Each blade 66 is mounted on a rotary shaft section 67, FIG. 3, supported in bearings 68 and 69. The two shaft sections 67 are rotationally driven independently but at the same speeds of rotation through pulleys 70 and belts 71 driven by an independent drive motor 72, FIG. 9. The shaft bearings 68 and 69 are suitably secured to the frame 20, FIG. 1, and the motor 72 is mounted on a frame extension 73. The shaft sections 67 and their trimming blades 66 are biased inwardly by expansion springs 74 fitted between the outward bearings 69 and fixed collars 75 on the shaft sections 67. The shafts 67 have movement limiting end caps 67' thereon.

Rigidly connected through arms 76, FIG. 3, with the shaft sections 67 somewhat outwardly of the blades 66 are pairs of arcuate parallel cam rods 77 which extend below the trimming blades 66, FIGS. 1 and 2, and parallel the periphery of the disc 50 down to the approximate point where the jaws 56 and 55 are initially closed to grip, pick up and transport the onions 22 toward the blades 66. As best shown in FIGS. 2 and 3, the bulbous bodies of the onions 22 carried by the closed jaws 55 and 56 pass between the two pairs of camming rods 77 FIG. 3, and depending upon the size of each onion, which is a variable, the onions themselves cause separation of the camming rods 77 and corresponding separation of the blades 66 with their shafts 67 against the springs 74. This allows the lateral spacing of the trimming blades 66 to be self-adjusting with each individual onion so that the protrusions 48 will be properly trimmed off by the blades 66 despite variations in the size of onions. This is a unique capability of the machine.

Each individual onion 22 is conveyed by a pair of the coacting jaws 56 and 55 into engagement with the rotating trimming blades 66 while the protrusions 48 are held on a transverse axis parallel to the axes of the blade shafts 67, FIG. 3. With this arrangement and the automatic lateral adjustability of the blades 66 above described, the protrusions 48 are cleanly trimmed off of each onion, without excessive waste and without incomplete trimming as might occur with some other prior art mechanisms. The entire operation at this critical point in the method is most efficient, reliable and uniform as to results.

Following trimming, as each trimmed onion 22', FIG. 2, is carried toward the top of the wheel 49, the pivoted jaw 56 is cammed open and each onion is released at the top of the wheel into a collection chute 78 which may deliver the trimmed onions to another processing conveyor 79, FIG. 1, or to any other desirable collection point. A spring-loaded deflector or pusher 80 at the top of the pick-up wheel 49 and chute 78 assists in guiding the released trimmed onions into the chute 78.

Figure 9:
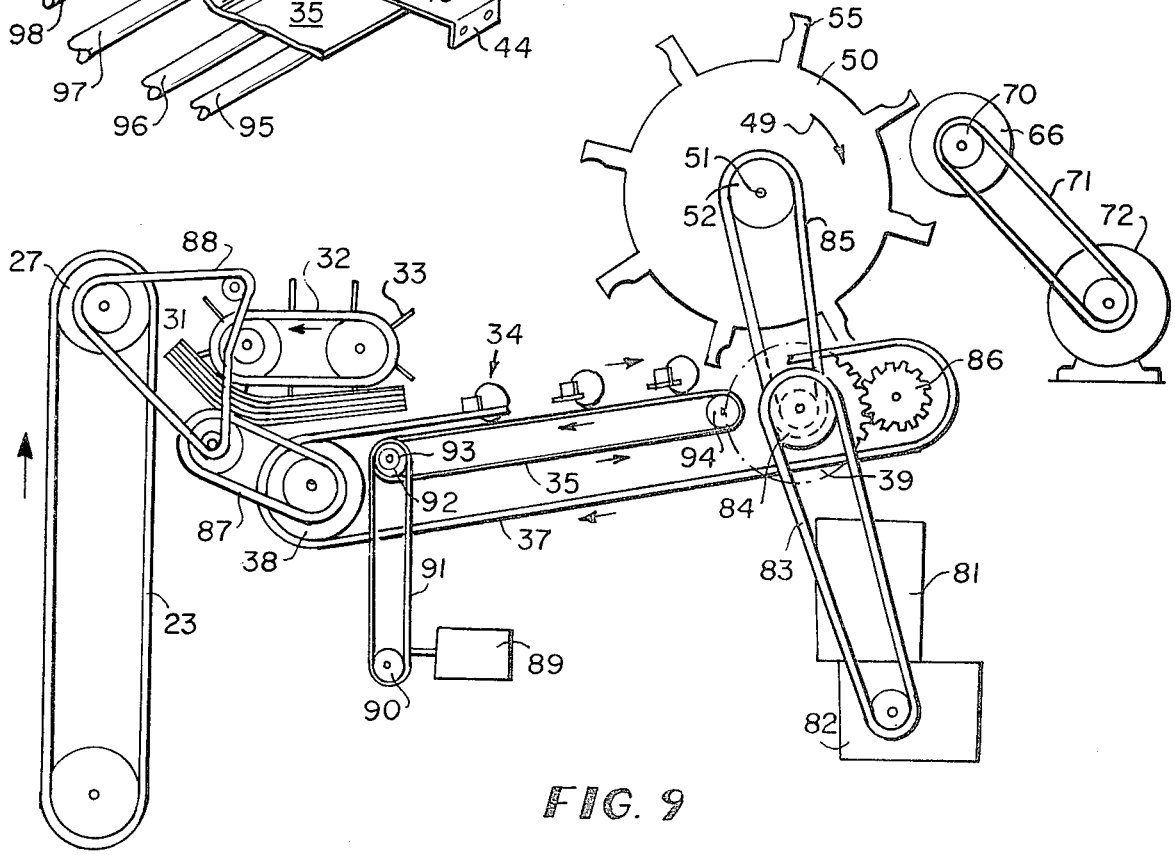
FIG. 9 is a schematic side elevation showing the power drive train of the machine.
Figure 10:
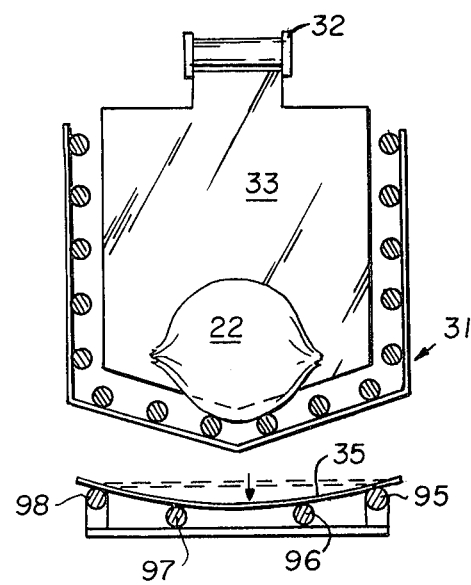
FIG. 10 is a cross-sectional view of the trough 10 showing a flight 33.
Figure 11:
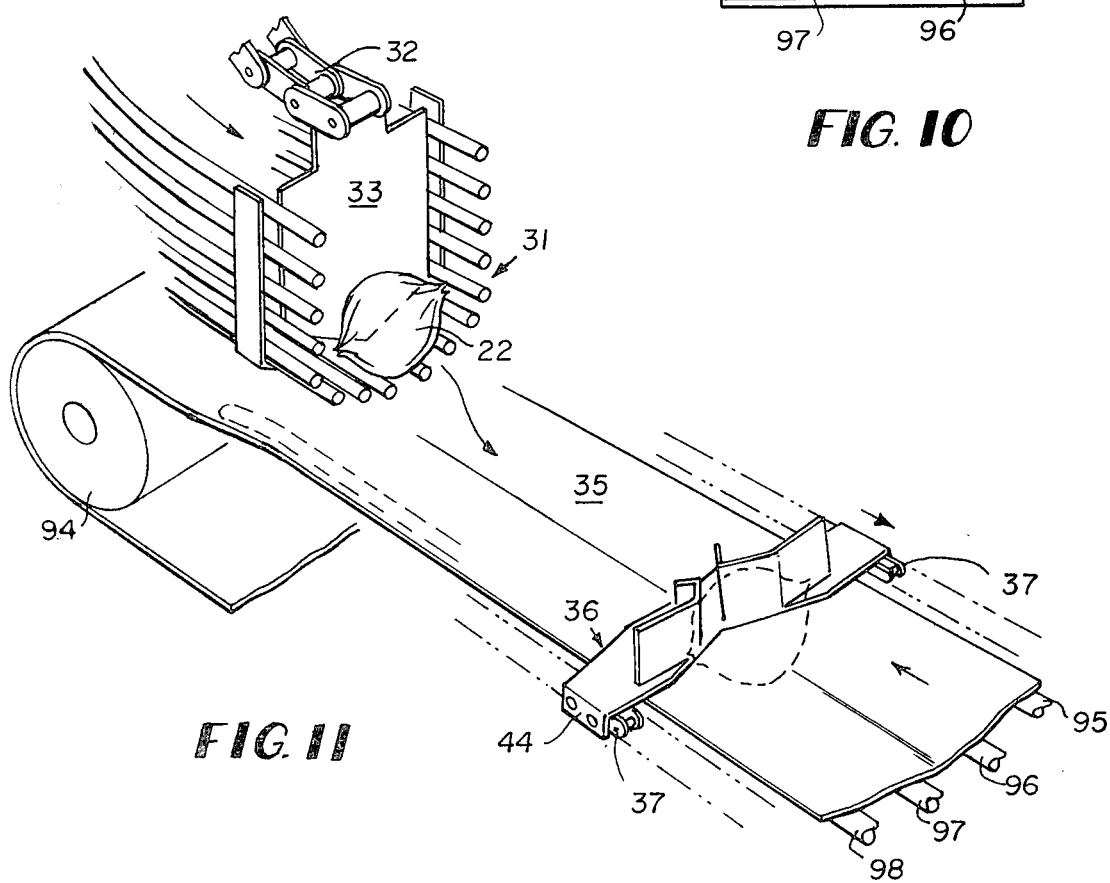
FIG. 11 is a perspective view of the belt and trough showing the manner of forming the belt in a V-configuration.

FIG. 9 schematically depicts the power drive system of the machine. A suitable gear motor 81 or equivalent power means on the frame 20 includes an output shaft 82 driving a first chain 83 leading upwardly to sprocket gearing 84 including a chain 85 which directly drives the pick-up wheel 49. Additional gearing 86 driven by sprocket gearing 84 operates the chains 37 of orientation device 34, which in turn at the lower ends of chains 37 through additional chain and sprocket gearing 87 drives the aforementioned chain 32 within the transfer trough 31, see FIG. 1. Additional gearing 88 operated by a sprocket gear of chain 32 drives the vertical singulator chain 23 in the manner shown. As previously described, the blades 66 have a separate drive motor 72 and gearing. All other moving components of the machine thus far described are powered by the drive unit 81. The drive train is simple and direct, as well as economical and compact.

In accordance with another feature of the invention, the trough 31 is formed in a U-configuration to preorient the onions prior to deposit onto the orientation device 34. By causing the onions to roll down the inclined portion 31A (FIG. 1), orientation with the stem axis transverse to the direction of roll is initiated. Thereafter the onions are contacted by a following flight 33 which continues the roll of the onion up the inclined trough portion 31B. By inclining this trough portion upwards, the onion is maintained in contact with the following flight and properly timed to drop from the trough onto the device 34 just ahead of a next-approaching pusher 36.

Further, the conveyor belt 35 includes a top portion onto which the onion drops from the trough 31 and serves both to increase the roll of the onion and maintain it on the device for completion of orientation. For this purpose the belt is driven by a motor 89 (FIGS. 1 and 4) rotating a drive sprocket 90 to drive a belt 91 extending to a sprocket 92 fixed to the end of a journaled drive roll 93. The conveyor belt 35 is supported between this drive roll 93 and a spaced roll 94. Thus by driving the belt 35 in the direction opposite to the movement of the pushers 36, the effective roll distance or number of rotations effected on the onions is greatly increased to improved the degree of orientation of the onions.

Also, the conveyor belt 35 is configured to maintain each onion on the belt and center it relative to the pushers 36. For this purpose, the top portion of the belt is maintained in a configuration as shown in FIG. 8. The belt rests in a plurality of longitudinally extending guide rods 95, 96, 97 and 98 with the center rods 96 and 97 being spaced lower than the outwardly positioned rods 95 and 98. The base plate 43 of each pusher 36 is V-configured and positioned to press downward on the upper belt portion as it passes thereacross to maintain this belt portion in contact with these rods. Thus the belt is maintained in a V-configuration with the center positioned lower than the side edges.

To further assist in maintaining the top portion of the conveyor belt 35 in a V-configuration, the guide rods 95, 96, 97 and 98 are positioned slightly above the normal plane of the belt. Thus the belt is caused to ride up over these rods and with the center rods 96 and 97 being positioned lower, the belt top portion is forced somewhat into a V-configured cross section.

The onions in being pushed therealong, naturally roll to the center of the conveyor belt and are maintained there by the configuration of the belt surface and the spaced flight sections 45 in contact with the onion. In this manner the onions are not only oriented with the stem axes transverse to the direction of roll, but they are also centered for a more precise pickup by the gripping jaws 55 and 56. If these jaws do not contact the spherical onion near the symmetrical center, it is possible for the jaws to slip from the onion for the onion to turn slightly under the gripping force of the jaws and in either instance, the trimming operation will be disrupted.

SUMMARY OF OPERATION

With the motor 72 and drive unit 81 in operation, the spoons 30 of singulator chain 23 lift individual onions 22 from the hopper 21 and deliver them to the transfer through trough 31 in which they are partially oriented and from which they are propelled by flights 33 onto the inclined conveyor belt 35. The moving pocketed flights 36 of inclined chains 37 roll the onions 22 upwardly along the belt 35 to gradually orient the axes of protrusions 48 across the longitudinal axis of the plate 35 as previously described. The V-configured belt and the flight sections center the onion in the proper position for being picked up in the properly oriented attitude.

Following such orientation, the cam operated jaws 56 and 55 of pick-up wheel 49 grip and lift each onion from the orientation device and transport it upwardly into engagement with the trimming blades 66. In so doing, the camming rods 77 are operated by the onions themselves in the manner described to cause automatic lateral adjustment of the blades 66 for the proper trimming of variously-sized onions.

At the top of the wheel 49 following the trimming operation, the jaws of the wheel are cammed open and the onions are released in succession and guided into chute 78.

It should be noted that in the operation of the pick-up wheel 49, the rigid jaws 55 in succession pass rearwardly of the flights 36 near the top of the device 34, FIG. 1. The passages 47 between flight sections 45 permit the jaws 55 to pass through these flights without interference.

It should be emphasized that the method and machine described herein are not limited to use with onions but can be utilized equally well with other produce of a similar shape requiring orientation and trimming.

Also in some cases, reciprocating trimming blades or other types of cutting blades may be utilized in lieu of the circular blades 66.

While the pick-up and transfer wheel 49 is very efficient and well suited to the purposes of the invention, in some cases other types of onion gripping and transferring means could be utilized including chain transport means or the like.

It is to be understood that the form of the invention herewith shown and described is to be taken as a preferred example of the same, and that various changes in the shape, size and arrangement of parts may be resorted to, without departing from the spirit of the invention or scope of the subjoined claims.

The invention claimed:

1. A machine for trimming onions or like produce comprising:

a storage receptacle to receive onions;

means to convey onions one at a time from said storage receptacle;

an orientation device positioned to receive the onions from said convey means, said orientation device comprising:

a power driven conveyor belt forming a surface moving in one direction for receiving the onions; and spaced pocket pusher elements and means for moving the elements along the conveyor belt surface in the direction opposing the direction of movement of the belt and in succession, each element comprising a pair of planar flight sections positioned end-to-end across said belt surface with adjacent ends spaced apart and extending away from the direction of travel to form a V-configured pusher element to receive and cause an onion to roll on said surface and thereby orient the stem axis across the plate while centering the onion relative to the flight sections;

means forming said conveyor belt surface in a V-configuration with the center lower to assist in holding the onions at the center of the belt surface;

a trimming station comprising a pair of laterally spaced trimming blades for engaging an onion moving therebetween to trim protrusions from opposite ends thereof;

means to grip and pick up each onion from the pusher element comprising:

a vertically disposed rotating disc supported for rotation about a horizontal axis;

a plurality of circumferentially spaced rigidly mounted first gripping jaws supported on and extending radially from said disc;

a second gripping jaw for each rigidly mounted gripping jaw mounted on the disc for pivoting towards and away from said corresponding rigid gripping jaw and thereby form pairs of gripping jaws;

spring means for biasing each second gripping jaw towards the corresponding rigid gripping jaw;

a profiled cam fixed to said disc and positioned to engage said second gripping jaws in succession and cyclically cause said second jaw to close towards the corresponding rigid jaw of the pair and remain closed at a position to hold an onion therebetween;

means supporting and rotating said disc for first swinging the pairs of gripping jaws through the center of the space between a pair of flight sections while each second jaw is being moved towards the corresponding first jaw to grip the oriented onion and carry it between the trimming blades to trim the protrusions therefrom; and said cam thereafter acting to move the second jaw from the first jaw to release the trimmed onion.

* * * * *